US012767588B2

(12) United States Patent
Kikkawa et al.

(10) Patent No.: US 12,767,588 B2
(45) **Date of Patent: *Oct. 20, 2026**

(54) GLASS CONTAINING CRYSTALLINE PHASE

(71) Applicant: OHARA INC., Kanagawa (JP)

(72) Inventors: Saya Kikkawa, Kanagawa (JP); Toshitaka Yagi, Kanagawa (JP); Ayano Mori, Kanagawa (JP)

(73) Assignee: OHARA INC., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/919,627

(22) Filed: Oct. 18, 2024

(65) Prior Publication Data

US 2026/0035289 A1 Feb. 5, 2026

(30) Foreign Application Priority Data

Oct. 20, 2023 (JP) ................................ 2023-181017

(51) Int. Cl.
*B32B 15/04* (2006.01)
*B32B 17/06* (2006.01)
*C03C 10/00* (2006.01)

(52) U.S. Cl.
CPC ...... *C03C 10/0009* (2013.01); *C03C 10/0027* (2013.01)

(58) Field of Classification Search
CPC .................................................. C03C 10/0027
USPC ......................................................... 428/426
See application file for complete search history.

(56) References Cited

U.S. PATENT DOCUMENTS 5,866,489 A * 2/1999 Yamaguchi ......... C03C 10/0045 501/63
6,191,058 B1 * 2/2001 Yamaguchi ......... C03C 10/0027 501/4
6,426,311 B1 * 7/2002 Goto ........................ G11B 5/82
7,170,154 B2 * 1/2007 Hachitani ............... C03C 3/085 257/680
11,081,133 B2 * 8/2021 Sato ................... G11B 5/73921
11,680,009 B2 * 6/2023 Yu ....................... C03C 10/0009 501/4
11,807,568 B2 * 11/2023 Ogasawara ......... C03C 10/0009
2002/0115550 A1 * 8/2002 Kawai ................. C03C 10/0036 501/63
2002/0137618 A1 * 9/2002 Goto ................... C03C 10/0027 501/4
2008/0248316 A1 * 10/2008 Goto ................... C03C 10/0045 427/457
2012/0107647 A1 * 5/2012 Matsumoto ............. C03C 3/097 501/63
2012/0188663 A1 * 7/2012 Isono ................. G11B 5/73921 360/110
2016/0060159 A1 * 3/2016 Kim ................... A61C 13/0006 501/63
2019/0362754 A1 * 11/2019 Sato ................... G11B 5/73921
2022/0144691 A1 * 5/2022 Ogasawara ............. C03B 32/02
2023/0312401 A1 * 10/2023 Kikkawa ............. C03C 10/0054 428/410
2023/0312402 A1 * 10/2023 Kikkawa ................. C03C 3/097 428/410
2024/0010546 A1 * 1/2024 Kikkawa ............. C03C 10/0009

FOREIGN PATENT DOCUMENTS

JP 2006347796 A 12/2006

* cited by examiner

*Primary Examiner* — Lauren R Colgan
(74) *Attorney, Agent, or Firm* — Li & Cai Intellectual Property (USA) Office

(57) ABSTRACT

Provided is a glass containing a crystalline phase, the glass including at least one crystalline phase selected from the group consisting of cristobalite, lithium disilicate, and petalite, in which an average linear expansion coefficient at 100° C. to 300° C. is $85\times10^{-7}$/° C. or more, and a glass transition point is 680° C. or higher.

13 Claims, No Drawings

GLASS CONTAINING CRYSTALLINE PHASE

FIELD OF THE DISCLOSURE

The present invention relates to a glass containing a crystalline phase.

BACKGROUND OF THE DISCLOSURE

Producing methods of camera modules used in smartphones, various semiconductor elements, and magnetic recording media are becoming more advanced and complicated, and various performance improvements are required for glass substrates used therein as well. For example, JP 2006-347796 discloses a glass member that exhibits specific physical properties.

SUMMARY OF THE DISCLOSURE

An object of the present invention is to provide a glass which is excellent in heat resistance and is capable of maintaining high dimensional accuracy even under high temperature conditions.

The present invention provides the following.

Configuration 1

A glass containing a crystalline phase, comprising:
- at least one crystalline phase selected from the group consisting of cristobalite, lithium disilicate, and petalite,
- wherein an average linear expansion coefficient at 100° C. to 300° C. is $85\times10^{-7}$/° C. or more, and
- a glass transition point is 680° C. or higher.

Configuration 2

A glass containing a crystalline phase, comprising:
- $SiO_2$, $Al_2O_3$, and $Li_2O$,
- wherein an average linear expansion coefficient at 100° C. to 300° C. is $85\times10^{-7}$/° C. or more, and
- a glass transition point is 680° C. or higher.

Configuration 3

The glass containing a crystalline phase according to Configuration 1 or 2, comprising:
- in mass % in terms of oxides,
- a $SiO_2$ component at a content of 65.0% to 85.0%;
- an $Al_2O_3$ component at a content of 1.5% to 10.0%; and
- a $Li_2O$ component at a content of more than 0% and 13.0% or less.

Configuration 4

The glass containing a crystalline phase according to any one of Configurations 1 to 3, comprising:
- in mass % in terms of oxides,
- a $P_2O_5$ component at a content of more than 0% and 5.0% or less; and
- a $ZrO_2$ component at a content of 2.0% or more.

Configuration 5

The glass containing a crystalline phase according to any one of Configurations 1 to 4, comprising:
- in mass % in terms of oxides,
- a $B_2O_3$ component at a content of 0% to 5.0%;
- a $Na_2O$ component at a content of 0% to 5.0%;

- a $K_2O$ component at a content of 0% to 5.0%;
- a MgO component at a content of 0% to 5.0%;
- a CaO component at a content of 0% to 5.0%;
- a ZnO component at a content of 0% to 5.0%;
- a $TiO_2$ component at a content of 0% to 5.0%;
- a $Gd_2O_3$ component at a content of 0% to 5.0%;
- a $Sb_2O_3$ component at a content of 0% to 3.0%; and
- a $Nb_2O_5$ component at a content of 0% to 3.0%.

Configuration 6

The glass containing a crystalline phase according to any one of Configurations 1 to 5, wherein, in mass % in terms of oxide, [(content of $SiO_2$ component+content of $Li_2O$ component)/content of $Al_2O_3$ component] is 6.4 or more.

Configuration 7

The glass containing a crystalline phase according to any one of Configurations 1 to 6, wherein a Vickers hardness is 700 or more.

Configuration 8

A magnetic recording medium substrate, semiconductor support substrate, or optical substrate comprising the glass containing a crystalline phase according to any one of Configurations 1 to 7.

According to the present invention, a glass which is excellent in heat resistance and is capable of maintaining high dimensional accuracy even under high temperature conditions can be provided.

DETAILED DESCRIPTION OF THE EXEMPLARY EMBODIMENTS

Hereinafter, embodiments and examples of a glass containing a crystalline phase of the present invention will be described in detail, but the present invention is not limited to the following embodiments and examples, and can be implemented with appropriate modifications within the scope of the object of the present invention.

[Glass 1 Containing Crystalline Phase]

A glass containing a crystalline phase according to a first embodiment of the present invention (hereinafter, also referred to as a "glass 1 containing a crystalline phase") includes at least one crystalline phase selected from the group consisting of cristobalite, lithium disilicate, and petalite, has an average linear expansion coefficient at 100° C. to 300° C. is $85\times10^{-7}$/° C. or more, and has a glass transition point of 680° C. or higher.

Since the glass 1 containing a crystalline phase has high average linear expansion coefficient, when it is used as a substrate for a magnetic recording medium, a semiconductor support substrate, an optical substrate or the like, it is possible to reduce the difference in average linear expansion coefficient between the glass and adjacent metal parts, thereby dimensional accuracy can be improved and deflection and peeling can be suppressed. In addition, since Tg is high, deformation during heating in manufacturing process of various devices and deformation caused by use in high-temperature environments can be suppressed.

The glass 1 containing a crystalline phase can be produced by appropriately adjusting a raw material composition and production conditions in accordance with a production method and Examples which will be described later.

<Various Physical Properties>

(Average Linear Expansion Coefficient (α))

The glass 1 containing a crystalline phase has an average linear expansion coefficient at 100° C. to 300° C. of $85\times10^{-7}$/° C. or more, and it may be $87\times10^{-7}$/° C. or more. By having such a high average linear expansion coefficient, when used as the various substrates described above, the thermal expansion characteristics can be made closer to those of the surrounding metal parts, and dimensional accuracy can be improved.

An upper limit of the average linear expansion coefficient is not particularly limited, and is, for example, $200\times10^{-7}$/° C. or less.

The average linear expansion coefficient is measured by a method described in Examples.

(Glass Transition Point (Tg))

The glass 1 containing a crystalline phase has a glass transition point of 680° C. or higher, and may be 690° C. or higher, 695° C. or higher, or 710° C. or higher. When having such a glass transition point, excellent heat resistance is exhibited.

An upper limit of the glass transition point is not particularly limited, and is, for example, 900° C. or lower.

The glass transition point is measured by a method described in Examples.

(Vickers Hardness (Hv))

The glass 1 containing a crystalline phase may have a Vickers hardness of 605 or more, 620 or more, 650 or more, or 700 or more.

When the Vickers hardness is high, there is an advantage that it is less likely to be scratched when the glass 1 containing a crystalline phase is used as the various substrates described above.

An upper limit of the Vickers hardness is not particularly limited, and is, for example, 1,000 or less.

The Vickers hardness is measured by a method described in Examples.

(E/ρ)

The glass 1 containing a crystalline phase may have the value of E/ρ, which is a ratio of Young's modulus E to specific gravity ρ, of 35 or more, 35.5 or more or 35.7 or more.

A high E/ρ means a material is light weight and has high rigidity, and for example, can minimize deflection and vibration during high-speed rotation when used as a substrate for a magnetic recording media.

An upper limit of E/ρ is not particularly limited, and is, for example, 60 or less or 50 or less.

The Young's modulus of the glass 1 containing a crystalline phase may be, for example, 83 GPa or more, 85 GPa or more, or 87 GPa or more.

An upper limit of the Young's modulus is not particularly limited, and is, for example, 120 GPa or less.

The Young's modulus E and E/ρ are measured by a method described in Examples.

<Glass Containing Crystalline Phase>

The glass containing a crystalline phase is a glass material having a crystalline phase and a glass phase, and is distinguished from an amorphous material. The crystalline phase of the glass containing a crystalline phase is discriminated using an angle of a peak appearing in an X-ray diffraction pattern of an X-ray diffraction analysis.

The glass 1 containing a crystalline phase is, for example, a crystallized glass. A crystallized glass is also called a glass ceramic, and is a material in which crystals are precipitated inside the glass by heat-treating the glass.

(Crystalline Phase)

The glass 1 containing a crystalline phase includes at least one crystalline phase selected from the group consisting of cristobalite (for example, α-cristobalite), lithium disilicate, and petalite.

In addition to the above, the glass 1 containing a crystalline phase may include, as another crystalline phase, one or more selected from lithium monosilicate, quartz, virgilite, and spodumene. The crystalline phase also includes a solid solution.

A method for confirming a crystalline phase is as described in Examples.

In one embodiment, the glass 1 containing a crystalline phase includes cristobalite and lithium disilicate, as crystalline phases.

In one embodiment, the glass 1 containing a crystalline phase includes cristobalite, lithium disilicate, and quartz, as crystalline phases.

In one embodiment, the glass 1 containing a crystalline phase includes cristobalite, lithium disilicate, lithium monosilicate, and petalite, as crystalline phases.

(Constituent Components)

Constituent components of the glass 1 containing a crystalline phase will be described.

In the present specification, contents of respective components are all expressed in mass % in terms of oxides unless otherwise specified. Here, the expression "in terms of oxides" refers to the amount of oxides of each component included in the glass containing a crystalline phase expressed in mass % when the total mass of oxides is 100 mass % assuming that all the glass constituent components containing a crystalline phase are decomposed and converted to oxides. In the present specification, A % to B % represent A % or more and B % or less.

In one embodiment, the glass 1 containing a crystalline phase includes $SiO_2$, $Al_2O_3$, and $Li_2O$.

In one embodiment, the glass 1 containing a crystalline phase includes the following components in the following composition in mass % in terms of oxides.

$SiO_2$ component at a content of 65.0% to 85.0%

$Al_2O_3$ component at a content of 1.5% to 10.0%

$Li_2O$ component at a content of more than 0% and 13.0% or less

In one embodiment, the glass 1 containing a crystalline phase includes the following components in the following composition in mass % in terms of oxides.

$P_2O_5$ component at a content of more than 0% and 5.0% or less $ZrO_2$ component at a content of 2.0% or more The glass 1 containing a crystalline phase may have a composition of any of the following configurations, or may have a composition obtained by appropriately combining any of the following configurations.

The $SiO_2$ component is a skeleton component constituting the glass containing a crystalline phase, and is a component for enhancing stability and facilitating precipitation of a desired crystalline phase. When the content of the $SiO_2$ component is 85.0% or less, it is easy to keep viscosity low and an excellent melting property is obtained. Also, when the content is 65.0% or more, stability of the glass containing a crystalline phase can be improved.

Therefore, an upper limit is preferably 85.0% or less, more preferably 83.0% or less, and still more preferably 80.0% or less. In addition, a lower limit is preferably 65.0% or more, more preferably 68.0% or more, and still more preferably more than 70.0%.

The $Al_2O_3$ component is a skeleton component constituting the glass containing a crystalline phase, and is a component for enhancing stability. When the content of the $Al_2O_3$ component is 10.0% or less, transmittance can be increased, excellent devitrification resistance is obtained and an excellent melting property is obtained. Also, when the content of the $Al_2O_3$ component is 1.5% or more, excellent stability is obtained.

Therefore, an upper limit is preferably 10.0% or less, 8.0% or less, or 5.9% or less, more preferably 5.5% or less, and still more preferably 5.3% or less. In addition, a lower limit can be preferably 1.5% or more, more preferably 1.8% or more, and still more preferably 2.0% or more.

The $Li_2O$ component is a component for improving a melting property of a raw glass, improving manufacturability, and facilitating precipitation of a desired crystalline phase. When the content of the $Li_2O$ component is 13.0% or less, excellent devitrification resistance is obtained, and excellent heat resistance is obtained while favorable chemical durability is maintained. When the content is more than 0%, it is easy to keep viscosity low, an excellent melting property is obtained, and the manufacturability can be enhanced. In addition, a desired crystalline phase can be obtained.

Therefore, an upper limit is preferably 13.0 or less and more preferably 12.0% or less, and can be, for example, 11.0% or less, 10.0% or less, or 9.5% or less.

A lower limit is preferably 0.1 or more, 1 or more, or 5.0% or more, more preferably 6.2% or more, and still more preferably 7.0% or more, and can be, for example, 8.1% or more or 9.0% or more.

The $P_2O_5$ component is a component for promoting crystal formation of the glass containing a crystalline phase. When the content of the $P_2O_5$ component is 5.0% or less, phase separation of a glass can be suppressed. When the content is more than 0%, a desired crystalline phase is easily obtained.

Therefore, an upper limit is preferably 5.0% or less, more preferably 4.5% or less, and still more preferably 4.0% or less. In addition, a lower limit can be preferably more than 0%, more preferably 0.5% or more, and still more preferably 1.0% or more.

The $ZrO_2$ component is a component serving as a nucleating agent for crystals. When the content of the $ZrO_2$ component is 12.5% or less, an excellent melting property is obtained. When the content of the $ZrO_2$ component is 2.0% or more, transmittance tends to be high, precipitated crystals are excellent in terms of homogenization and refinement, and excellent mechanical strength and chemical durability of materials are obtained.

Therefore, an upper limit is preferably 12.5% or less, and can be, for example, 12.0% or less, 11.5% or less, 11.0% or less, 10.0% or less, or 9.0% or less.

A lower limit is preferably 2.0% or more, and more preferably 3.0% or more, and may be, for example, 4.0% or more, 5.0% or more, or 6.0% or more.

Although the glass containing a crystalline phase according to the present invention can be produced even when a content of a MgO component is 0%, the MgO component improves a low-temperature melting property when the content is more than 0%. When the content of the MgO component is 5.0% or less, chemical strengthening is likely to be performed.

Therefore, an upper limit can be preferably 5.0% or less, more preferably 3.0% or less, and still more preferably less than 2.0%. In addition, a lower limit can be preferably 0% or more, and may be, for example, 0.1% or more or 0.2% or more.

The content of a MgO component may be less than 2.5 mol %.

Although the glass containing a crystalline phase according to the present invention can be produced even when a content of a ZnO component is 0%, the ZnO component improves a low-temperature melting property when the content is more than 0%. When the content of the ZnO component is 5.0% or less, chemical strengthening is likely to be performed.

Therefore, an upper limit can be preferably 5.0% or less, more preferably 3.0% or less, and still more preferably less than 2.0%. In addition, a lower limit can be preferably 0% or more, more preferably more than 0%, still more preferably 0.1% or more, and still further preferably 0.2% or more.

Although the glass containing a crystalline phase according to the present invention can be produced even when a content of a CaO component is 0%, the CaO component is an optional component that improves a low-temperature melting property when the content is more than 0%. When the content of the CaO component is 5.0% or less, chemical strengthening is likely to be performed.

Therefore, an upper limit can be preferably 5.0% or less, more preferably 3.0% or less, and still more preferably less than 1.0%. In addition, a lower limit can be preferably 0% or more, and may be, for example, more than 0%, 0.1% or more, 0.2% or more, or 0.3% or more.

The content of a CaO component may be less than 5.0 mol %.

A $K_2O$ component and a $Na_2O$ component are components that improve a melting property of a raw glass and enhance manufacturability. When the content of each of the $K_2O$ component and the $Na_2O$ component is 5.0% or less, excellent devitrification resistance is obtained, and excellent heat resistance is obtained while favorable chemical durability is maintained. In addition, although the glass containing a crystalline phase according to the present invention can be produced even when the contents of the $K_2O$ component and the $Na_2O$ component are 0% respectively, it is easy to keep viscosity low, an excellent melting property is obtained, and the manufacturability can be enhanced, when the content is more than 0%.

Therefore, an upper limit of the $Na_2O$ component is preferably 5.0% or less, more preferably 4.0% or less, still more preferably less than 3.0%, and still further preferably less than 2.0%. In addition, a lower limit is preferably 0% or more, more preferably 0.2% or more, and still more preferably 0.3% or more.

An upper limit of the $K_2O$ component is preferably 5.0% or less and more preferably 4.0% or less, and can be, for example, 3.0% or less, 2.0% or less, or 1.0% or less. A lower limit is preferably 0% or more, more preferably 0.2% or more, and still more preferably 0.3% or more, and can be, for example, 0.5% or more.

A $Sb_2O_3$ component is a component that functions as a clarifying agent when raw glass is produced. An upper limit can be preferably 3.0% or less, more preferably 2.0% or less, still more preferably 1.0% or less, still further preferably 0.6% or less, and even more preferably 0.5% or less. A lower limit can be preferably 0% or more, more preferably 0.01% or more, and still more preferably 0.03% or more.

A $B_2O_3$ component is a component having an effect of lowering viscosity of a raw glass. When a content of the $B_2O_3$ component is 5.0% or less, excellent devitrification resistance is obtained, and it becomes easier to obtain a desired crystal. In addition, although the glass according to the present invention can be produced even when the content of the $B_2O_3$ component is 0%, it is easy to keep viscosity of a raw glass low and an excellent melting property is obtained, when the content is more than 0%.

Therefore, an upper limit can be preferably 5.0% or less, more preferably 4.5% or less, and still more preferably 4.0% or less. In addition, a lower limit can be preferably 0% or more, more preferably more than 0%, still more preferably 0.1% or more, and still further preferably 0.3% or more.

A $TiO_2$ component is a component serving as a nucleating agent for crystals. When a content of the $TiO_2$ component is 5.0% or less, excellent devitrification resistance is obtained and an excellent melting property of a raw glass is obtained. In addition, although the glass containing a crystalline phase according to the present invention can be produced even when the content of the $TiO_2$ component is 0%, a desired crystalline phase is easily obtained when the content is more than 0%.

Therefore, an upper limit can be preferably 5.0% or less, more preferably 4.5% or less, and still more preferably 4.0% or less. In addition, a lower limit can be preferably 0% or more, and may be, for example, more than 0%, 0.1% or more, or 0.3% or more.

A $Gd_2O_3$ component is a component that improves hardness.

When a content of the $Gd_2O_3$ component is 5.0% or less, excellent devitrification resistance is obtained. In addition, although the glass according to the present invention can be produced even when the content of the $Gd_2O_3$ component is 0%, it is excellent in improving the hardness when the content is more than 0%.

Therefore, an upper limit can be preferably 5.0% or less, more preferably 4.5% or less, and still more preferably 4.0% or less. In addition, a lower limit can be preferably 0% or more, more preferably more than 0%, still more preferably 0.1% or more, and still further preferably 0.3% or more.

A $Nb_2O_5$ component is a component that improves hardness. When a content of the $Nb_2O_5$ component is 3.0% or less, excellent devitrification resistance is obtained.

In addition, although the glass according to the present invention can be produced even when the content of the $Nb_2O_5$ component is 0%, it is excellent in improving the hardness when the content is more than 0%.

Therefore, an upper limit can be preferably 3.0% or less, more preferably 2.0% or less, and still more preferably 1.0% or less. In addition, a lower limit can be preferably 0% or more, more preferably more than 0%, still more preferably 0.1% or more, and still further preferably 0.3% or more.

When [(content of $SiO_2$ component+content of $Li_2O$ component)/content of $Al_2O_3$ component] is 6.4 or more, α-cristobalite and lithium disilicate are easily formed as crystalline phases.

Therefore, an upper limit of [(content of $SiO_2$ component+content of $Li_2O$ component)/content of $Al_2O_3$ component] is preferably 50.0 or less, more preferably 48.0 or less, and still more preferably 45.0 or less. A lower limit is preferably 6.4 or more, more than 13.9, still more preferably 14.5 or more, and still further preferably 15.0 or more.

[(Content of $K_2O$ component+content of $Al_2O_3$ component)/content of $ZrO_2$ component] may be 2.4 or less. When the ratio is 2.4 or less, α-cristobalite and lithium disilicate can be easily formed as crystalline phases.

Therefore, an upper limit of [(content of $K_2O$ component+content of $Al_2O_3$ component)/content of $ZrO_2$ component] is preferably 2.4 or less, 1.5 or less, or less than 0.88, more preferably 0.87 or less, and still more preferably 0.85 or less. A lower limit is preferably 0.10 or more, more preferably 0.15 or more, and still more preferably 0.20 or more.

The [(content of $P_2O_5$ component+content of $K_2O$ component+content of MgO component+content of $Al_2O_3$ component)/content of $ZrO_2$ component] may be 5.2 or less. When the ratio is 5.2 or less, α-cristobalite and lithium disilicate can be easily formed as crystalline phases.

Therefore, an upper limit of the [(content of $P_2O_5$ component+content of $K_2O$ component+content of MgO component+content of $Al_2O_3$ component)/content of $ZrO_2$ component] is preferably 5.2 or less, 4.0 or less, 2.0 or less, or less than 1.32, more preferably 1.28 or less, and still more preferably 1.25 or less. A lower limit is preferably 0.2 or more, more preferably 0.3 or more, and still more preferably 0.4 or more.

Although the glass according to the present invention can be produced even when a content of a SrO component or a BaO component 0%, the SrO component and the BaO component are optional components that improve a low-temperature melting property when the content is more than 0%. When the content of each of the SrO component and the BaO component is 5.0% or less, chemical strengthening is likely to be performed.

Therefore, an upper limit of each of the SrO component and the BaO component can be preferably 5.0% or less, more preferably 3.0% or less, and still more preferably 1.0% or less.

When a total content of the CaO component and the MgO component [content of CaO component+content of MgO component] is 5.0% or less, chemical strengthening is likely to be performed. Although the glass according to the present invention can be produced even when the total content is 0%, an excellent melting property is obtained when the total content is more than 0%.

Therefore, an upper limit of [content of CaO component+content of MgO component] is preferably 5.0% or less, more preferably 3.0% or less, still more preferably less than 3.0%, and still further preferably 1.0% or less.

In addition, a lower limit of [content of CaO component+content of MgO component] can be preferably 0% or more, and may be, for example, 0.1% or more and 0.2% or more.

A total content of the MgO component, the CaO component, the SrO component, and the BaO component [content of MgO component+content of CaO component+content of SrO component+content of BaO component] may be less than 10.0 mol %.

Although the glass according to the present invention can be produced even when a total content of the $K_2O$ component and the $Na_2O$ component [content of $K_2O$ component+content of $Na_2O$ component] is 0%, it is easy to keep viscosity low and a melting temperature is kept low when the total content is more than 0%. When the total content is 5.0% or less, excellent devitrification resistance is obtained, and excellent heat resistance is obtained while favorable chemical durability is maintained.

Therefore, an upper limit of [content of $K_2O$ component+content of $Na_2O$ component] is preferably 5.0% or less, more preferably 4.0% or less, still more preferably less than 4.0%, still further preferably less than 3.0%, and even more preferably less than 2.0%. In addition, a lower limit is preferably 0% or more, more preferably 0.2% or more, and still more preferably 0.3% or more.

[Content of $Al_2O_3$ component/content of $ZrO_2$ component] may be more than 0 and 1.0 or less. When the ratio is 1.0 or less, a desired crystalline phase is easily obtained, and when the ratio is more than 0, excellent devitrification is obtained, and glass is easily stabilized.

Therefore, an upper limit of [content of $Al_2O_3$ component/content of $ZrO_2$ component] is preferably 1.0 or less, more preferably 0.9 or less, and still more preferably 0.8 or less. Also, a lower limit is preferably more than 0, more preferably 0.1 or more, and still more preferably 0.2 or more.

[Content of $Li_2O$ component+content of $Al_2O_3$ component] may be 6.5% to 15.5%. When the content is 15.5% or less, generation of a lithium aluminum silicate crystalline phase is easily suppressed, and when the content is 6.5% or more, a desired crystalline phase is easily obtained and glass is easily stabilized.

Therefore, an upper limit of [content of $Li_2O$ component+content of $Al_2O_3$ component] is preferably 15.5% or less and more preferably 15.0% or less, and may be, for example, 14.0% or less. A lower limit is preferably 6.5% or more, more preferably 8.0% or more, and still more preferably 10.0% or more.

[(Content of $Li_2O$ component+content of $Al_2O_3$ component)/content of $ZrO_2$ component] may be 1.0 to 2.7. When the ratio is 2.7 or less, generation of a lithium aluminum silicate crystalline phase is easily suppressed, and when the ratio is 1.0 or more, a desired crystalline phase is easily obtained and glass is easily stabilized.

Therefore, an upper limit of [(content of $Li_2O$ component+content of $Al_2O_3$ component)/content of $ZrO_2$ component] is preferably 2.7 or less and more preferably 2.4 or less, and may be, for example, 2.1 or less. A lower limit is preferably 1.0 or more, more preferably 1.3 or more, and still more preferably 1.6 or more.

[Content of $SiO_2$ component/(content of $P_2O_5$ component+content of $Li_2O$ component+content of $Na_2O$ component+content of $K_2O$ component)] may be 4.5 or more. When the ratio is 4.5 or more, a desired crystalline phase is easily obtained.

Therefore, a lower limit is preferably 4.5 or more, and more preferably 5.0 or more. In addition, when [content of $SiO_2$ component/(content of $P_2O_5$ component+content of $Li_2O$ component+content of $Na_2O$ component+content of $K_2O$ component)] is 20.0 or less, it is easy to precipitate a desired crystalline phase, it is easy to keep the viscosity low, and an excellent melting property is obtained.

Therefore, an upper limit of [content of $SiO_2$ component/(content of $P_2O_5$ component+content of $Li_2O$ component+content of $Na_2O$ component+content of $K_2O$ component)] may be, for example, 20.0 or less, 10.0 or less, or 7.5 or less.

[Content of $K_2O$ component/content of $ZrO_2$ component] may be more than 0 and less than 0.5. When the ratio is less than 0.5, a desired crystalline phase is easily obtained, and when the ratio is more than 0, it is easy to keep the viscosity low, an excellent melting property is obtained, and the manufacturability is easily enhanced.

Therefore, an upper limit of [content of $K_2O$ component/content of $ZrO_2$ component] is preferably less than 0.5, more preferably 0.4 or less, and still more preferably 0.3 or less. A lower limit is preferably more than 0, and may be, for example, 0.1 or more.

[(Content of $K_2O$ component+content of $Al_2O_3$ component)/content of $ZrO_2$ component] may be more than 0 and 0.85 or less. When the ratio is 0.85 or less, generation of a lithium aluminum silicate crystalline phase is easily suppressed, and when the ratio is more than 0, a glass is easily stabilized.

Therefore, an upper limit of [(content of $K_2O$ component+content of $Al_2O_3$ component)/content of $ZrO_2$ component] is preferably 0.85 or less and more preferably 0.80 or less, and may be, for example, 0.75 or less. Also, a lower limit is preferably more than 0, more preferably 0.1 or more, and still more preferably 0.2 or more.

[(Content of $K_2O$ component+content of $Al_2O_3$ component)/(content of ZnO component+content of $ZrO_2$ component)] may be more than 0 and 0.95 or less. When the ratio is 0.95 or less, generation of a lithium aluminum silicate crystalline phase is easily suppressed, and when the ratio is more than 0, a glass is easily stabilized.

Therefore, an upper limit of [(content of $K_2O$ component+content of $Al_2O_3$ component)/(content of ZnO component+content of $ZrO_2$ component)] is preferably 0.95 or less, more preferably 0 or 90 or less, and still more preferably 0.85 or less. Also, a lower limit is preferably more than 0, more preferably 0.1 or more, and still more preferably 0.2 or more.

The glass containing a crystalline phase of the present invention may or may not contain each of $Bi_2O_3$, $Cr_2O_3$, CuO, $La_2O_3$, MnO, $MoO_3$, PbO, $V_2O_5$, $WO_3$, and $Y_2O_3$ components as long as the effects of the present invention are not impaired. When these components are not contained, there is an effect of preventing the transmittance from deteriorating.

The glass containing a crystalline phase may or may not further include other components not described above as long as the properties of the glass containing a crystalline phase of the present invention are not impaired. Examples thereof include metal components (including metal oxides thereof) such as Yb, Lu, Fe, Co, Ni, and Ag.

Also, a $SnO_2$ component, a $CeO_2$ component, an $As_2O_3$ component, and one or more selected from the group consisting of F, NOx, and SOx may or may not be included in addition to the $Sb_2O_3$ component as a glass clarifying agent. However, an upper limit of a content of the clarifying agent can be preferably 3.0% or less, more preferably 2.0% or less, still more preferably 1.0% or less, and most preferably 0.6% or less.

Meanwhile, since each component of Pb, Th, Tl, Os, Be, Cl, and Se tends to be refrained from being used as they are harmful chemical substances in recent years, it is preferable that these components are not substantially included.

(Production Method)

The glass 1 containing a crystalline phase (for example, crystallized glass) can be produced by uniformly mixing raw materials so that each component falls within a predetermined content range, melting and molding the mixture to produce a raw glass, and then crystallizing the raw glass.

A heat treatment for crystal precipitation may be performed in one stage or in two stages.

In a two-stage heat treatment, first, a nucleation step is performed by performing a heat treatment at a first temperature, and after the nucleation step, a crystal growth step is performed by performing a heat treatment at a second temperature higher than that of the nucleation step.

The first temperature of the two-stage heat treatment can be preferably 400° C. to 680° C., more preferably 450° C. to 650° C., and still more preferably 500° C. to 600° C.

The retention time at the first temperature is preferably 30 minutes to 2,000 minutes, and more preferably 180 minutes to 1,440 minutes.

The second temperature of the two-stage heat treatment is preferably 680° C. or higher, for example, 700° C. to 850° C., preferably 700° C. to 800° C., and more preferably 700° C. to 780° C. The retention time at the second temperature is preferably 30 minutes to 600 minutes, and more preferably 60 minutes to 400 minutes.

In a one-stage heat treatment, a nucleation step and a crystal growth step are continuously performed at a one-stage temperature. Usually, the temperature is raised to a predetermined heat treatment temperature, and after reaching the heat treatment temperature, the temperature is maintained for a certain period of time, and then the temperature is lowered.

In the case of performing the one-stage heat treatment, the temperature of the heat treatment is preferably 680° C. or higher, for example, 700° C. to 850° C., and preferably 700° C. to 800° C. The retention time at the temperature of the heat treatment is preferably 30 minutes to 500 minutes, and more preferably 60 minutes to 400 minutes.

(Strengthening Method)

The glass 1 containing a crystalline phase may be strengthened by various strengthening methods to form a compressive stress layer on a surface thereof.

Examples of a method for forming a compressive stress layer on a surface by strengthening the glass containing a crystalline phase include a chemical strengthening method in which an alkali component present in a surface layer of a glass containing a crystalline phase is subjected to an exchange reaction with an alkali component having an ionic radius larger than that of the alkali component of the surface layer to form a compressive stress layer on the surface layer.

The chemical strengthening method can be performed, for example, in the following steps. A glass containing a crystalline phase is brought into contact with or immersed in a salt containing potassium or sodium, for example, potassium nitrate ($KNO_3$), sodium nitrate ($NaNO_3$), a mixed salt thereof, or a molten salt of a composite salt. The treatment (chemical strengthening treatment) of contacting with or immersing in the molten salt may be performed in one stage or in two stages.

The method of strengthening the glass 1 containing a crystalline phase is not limited to the chemical strengthening method, and for example, a thermal strengthening method, an ion implantation method, or the like may be used.

[Application]

The glass 1 containing a crystalline phase can be used as a magnetic recording medium substrate, a semiconductor support substrate, or an optical substrate.

(Magnetic Recording Medium Substrate)

When used as a magnetic recording medium substrate, the magnetic recording medium is called a magnetic disk, a hard disk, or the like, and is used in an internal storage device or the like of a desktop personal computer, a server computer, a laptop personal computer, a mobile personal computer, or the like.

In a case where the glass 1 containing a crystalline phase is used as a substrate of a magnetic recording medium (For example a HAMR type magnetic recording medium), a magnetic recording layer containing a magnetic material is provided on the substrate to form a magnetic recording medium, and a magnetic recording apparatus is formed by including constituent components such as a magnetic recording head.

As the magnetic recording layer and other constituent components of the magnetic recording apparatus, well-known ones can be applied.

(Optical Substrate)

The glass 1 containing a crystalline phase can be used as a substrate (optical substrate) for an optical module built into an optical device (imaging device), etc., and can be used, for example, as a substrate for a camera module in which lenses and semiconductor sensors (CCD, CMOS, etc.) are stacked. One method for mass-producing such camera modules is wafer level optics technology, in which a large number of lens modules are formed on a single wafer and then cut. The glass 1 containing a crystalline phase can also be used in this method. Glass 1 containing a crystalline phase can also be used as a substrate for an optical filter (optical substrate) for stacking optical filter, and can be used, for example, as a substrate for stacking dielectric filters for separating optical signals by wavelength in the field of optical fiber communications.

(Semiconductor Support Substrate)

The glass 1 containing a crystalline phase can be used as a semiconductor support substrate on which various semiconductor elements are mounted. In this case, glass 1 containing a crystalline phase may be used only during the manufacture of the semiconductor element and not finally included in the semiconductor element, or it may be finally included in the semiconductor element. As a method for manufacturing a semiconductor element, for example, there is a method (wafer-level packaging technology) in which a semiconductor layer, wiring layer, etc. are stacked on the glass substrate, and sealed with a sealing resin as necessary, and the glass substrate is peeled off by light irradiation or the like to obtain a semiconductor element. The glass 1 containing a crystalline phase can also be used in this method.

[Glass 2 Containing Crystalline Phase]

A glass containing a crystalline phase according to the second embodiment of the present invention (hereinafter, also referred to as a "glass 2 containing a crystalline phase") includes $SiO_2$, $Al_2O_3$, and $Li_2O$, has an average linear expansion coefficient at 100° C. to 300° C. is $85\times10^{-7}$/° C. or more, and has a glass transition point of 680° C. or higher.

The "glass 2 containing a crystalline phase" is different from the "glass 1 containing a crystalline phase" described above in that the requirement regarding a crystalline phase "including at least one crystalline phase selected from the group consisting of cristobalite, lithium disilicate, and petalite" is not essential and the requirement regarding a composition "including $SiO_2$, $Al_2O_3$, and $Li_2O$" is essential, but the other points are the same as the "glass 1 containing a crystalline phase", and the matters described in the "glass 1 containing a crystalline phase" can also be applied to the "glass 2 containing a crystalline phase".

The glass 2 containing a crystalline phase includes $SiO_2$, $Al_2O_3$, and $Li_2O$. Contents thereof and other components are as described in (Constituent components of glass) and the like of "Glass 1 containing a crystalline phase", and can be applied to the glass 2 containing a crystalline phase.

In one embodiment, the glass 2 containing a crystalline phase includes at least one crystalline phase selected from the group consisting of cristobalite, lithium disilicate, and petalite. Details of the conditions and other features related to the crystalline phase are as described in (Crystalline phase) and the like of "Glass 1 containing crystalline phase", and can be applied to the glass 2 containing a crystalline phase.

EXAMPLES

Examples 1 to 8 and Comparative Example 1

(1) Preparation of Raw Materials

As raw materials of respective components of a glass containing a crystalline phase, raw materials of oxides, carbonates, or phosphates corresponding thereto were selected, and these raw materials were weighed so as to have the composition described in Table 1 and uniformly mixed. The composition of Comparative Example 1 is the same as that of Example 21 of JP 2006-347796.

(2) Production of Glass Containing Crystalline Phase

Next, the mixed raw materials were put into a platinum crucible and melted at 1,300° C. to 1,600° C. for 2 to 24 hours in an electric furnace according to the melting difficulty of the glass composition. Thereafter, the molten glass was stirred to be homogenized, the temperature was lowered to 1,000° C. to 1,450° C., and the glass was then cast into a mold and slowly cooled to prepare a raw glass. The obtained raw glass was heated under nucleation conditions and nucleation growth (crystallization) conditions shown in Table 2 to prepare a glass containing a crystalline phase.

In Comparative Example 1, the raw glass was not crystallized.

(3) Confirmation of Crystalline Phase

The crystalline phase contained in the glass containing a crystalline phase obtained in (2) was determined from an angle of a diffraction peak appearing in the X-ray diffraction pattern measured using an X-ray diffraction analyzer (manufactured by Bruker, D8 Discover). The confirmed crystalline phases are shown in Table 2.

In the table, "Cri." is an abbreviation for α-cristobalite, "$Li_2Si_2O_5$" is an abbreviation for lithium disilicate, "$Li_2SiO_3$" is an abbreviation for lithium monosilicate, "Quartz" refers to quartz, and "Petalite" refers to petalite.

(4) Young's Modulus E

The Young's modulus of the glass containing a crystalline phase (raw glass in Comparative Example 1) obtained in (2) was measured by an ultrasonic pulse method in JIS R1602.

(5) Specific Gravity ρ

The specific gravity of the glass containing a crystalline phase obtained in (2) (raw glass in Comparative Example 1) was measured according to Japanese Industrial Standards JIS Z 8807 (2012) "Methods of measuring density and specific gravity of solid".

(6) Ratio of Young's modulus E to specific gravity ρ:E/ρ

The value of the Young's modulus E obtained in (4) was divided by the value of the specific gravity p obtained in (5) to determine the ratio (E/ρ) thereof.

(7) Glass Transition Point Tg

The glass transition point (Tg) of the glass containing a crystalline phase obtained in (2) (raw glass in Comparative Example 1) was measured according to Japan Optical Glass Industry Association Standard JOGIS08-2019 "Measuring Method for Thermal Expansion of Optical Glass".

(8) Average Linear Expansion Coefficient α

The average linear expansion coefficient in the temperature range of 100° C. to 300° C. was measured using TD5000SA manufactured by Bruker with reference to Japan Optical Glass Industry Association Standard JOGIS08-2019 "Measuring Method for Thermal Expansion of Optical Glass". The glass containing a crystalline phase obtained in (2) (raw glass in Comparative Example 1) was processed into a columnar shape having a diameter of 4 mm and a length of 20 mm, and an average linear expansion coefficient was calculated from the slope of an expansion curve showing the relationship between the temperature and the elongation of a material in a temperature range of 100° C. to 300° C.

(9) Vickers Hardness Hv

Using a diamond quadrangular pyramid indenter having a facing angle of 136°, the load when a pyramidal indentation was provided on a sample surface of the glass containing a crystalline phase obtained in (2) (raw glass in Comparative Example 1) was divided by the surface area (mm2) calculated from the length of the indentation. Measurement was performed with a test load of 200 gf and a retention time of 10 seconds using Micro Vickers hardness tester HMV-G21D manufactured by Shimadzu Corporation.

TABLE 1

| | | Example | | | | | | | | Com. Ex. |
|---|---|---|---|---|---|---|---|---|---|---|
| | | 1 | 2 | 3 | 4 | 5 | 6 | 7 | 8 | 1 |
| Raw glass composition (wt %) | $SiO_2$ | 76.86 | 77.36 | 75.35 | 75.84 | 74.79 | 75.78 | 76.36 | 76.36 | 64.92 |
| | $Al_2O_3$ | 2.74 | 3.24 | 2.69 | 3.18 | 4.74 | 3.74 | 3.74 | 3.74 | 10.17 |
| | $B_2O_3$ | 0.00 | 0.00 | 0.00 | 1.96 | 0.00 | 0.00 | 0.00 | 0.00 | 0.00 |
| | $P_2O_5$ | 2.04 | 2.04 | 2.00 | 2.00 | 2.14 | 2.14 | 2.04 | 2.04 | 0.00 |
| | $Li_2O$ | 10.45 | 9.95 | 10.25 | 9.75 | 9.94 | 9.94 | 9.45 | 9.45 | 0.05 |
| | $Na_2O$ | 0.00 | 0.50 | 0.00 | 0.49 | 0.00 | 0.00 | 0.00 | 0.00 | 9.38 |
| | $K_2O$ | 0.73 | 0.73 | 0.72 | 0.72 | 0.73 | 0.43 | 0.73 | 0.73 | 0.00 |
| | MgO | 0.00 | 0.00 | 0.00 | 0.00 | 0.00 | 0.00 | 0.00 | 0.00 | 11.39 |
| | CaO | 0.00 | 0.00 | 0.00 | 0.00 | 0.00 | 0.00 | 0.00 | 0.00 | 0.00 |
| | ZnO | 1.50 | 0.50 | 1.47 | 0.49 | 0.50 | 0.50 | 0.50 | 0.50 | 0.00 |
| | $ZrO_2$ | 5.60 | 5.60 | 5.49 | 5.49 | 7.09 | 7.09 | 7.12 | 7.12 | 4.10 |
| | $Nb_2O_5$ | 0.00 | 0.00 | 0.00 | 0.00 | 0.00 | 0.30 | 0.00 | 0.00 | 0.00 |
| | $Gd_2O_3$ | 0.00 | 0.00 | 1.96 | 0.00 | 0.00 | 0.00 | 0.00 | 0.00 | 0.00 |
| | $Sb_2O_3$ | 0.08 | 0.08 | 0.08 | 0.08 | 0.08 | 0.08 | 0.06 | 0.06 | 0.00 |
| | $TiO_2$ | 0.00 | 0.00 | 0.00 | 0.00 | 0.00 | 0.00 | 0.00 | 0.00 | 0.00 |
| | SrO | 0.00 | 0.00 | 0.00 | 0.00 | 0.00 | 0.00 | 0.00 | 0.00 | 0.00 |
| | BaO | 0.00 | 0.00 | 0.00 | 0.00 | 0.00 | 0.00 | 0.00 | 0.00 | 0.00 |
| | total | 100.00 | 100.00 | 100.00 | 100.00 | 100.00 | 100.00 | 100.00 | 100.00 | 100.00 |
| Composition ratio | $(SiO_2 + Li_2O)/Al_2O_3$ | 31.86 | 26.95 | 31.82 | 26.92 | 17.89 | 22.94 | 22.94 | 22.94 | 6.39 |
| | $(K_2O + Al_2O_3)/ZrO_2$ | 0.62 | 0.71 | 0.62 | 0.71 | 0.77 | 0.59 | 0.63 | 0.63 | 2.48 |
| | $(P_2O_5 + K_2O + MgO + Al_2O_3)/ZrO_2$ | 0.98 | 1.07 | 0.99 | 1.07 | 1.07 | 0.89 | 0.91 | 0.91 | 5.26 |
| | CaO + MgO | 0.00 | 0.00 | 0.00 | 0.00 | 0.00 | 0.00 | 0.00 | 0.00 | 11.39 |
| | $K_2O + Na_2O$ | 0.73 | 1.23 | 0.72 | 1.21 | 0.73 | 0.43 | 0.73 | 0.73 | 9.38 |
| | $Al_2O_3/ZrO_2$ | 0.49 | 0.58 | 0.49 | 0.58 | 0.67 | 0.53 | 0.53 | 0.53 | 2.48 |
| | $Li_2O + Al_2O_3$ | 13.19 | 13.19 | 12.94 | 12.93 | 14.68 | 13.68 | 13.19 | 13.19 | 10.22 |
| | $(Li_2O + Al_2O_3)/ZrO_2$ | 2.36 | 2.36 | 2.36 | 2.36 | 2.07 | 1.93 | 1.85 | 1.85 | 2.49 |
| | $SiO_2/(P_2O_5 + Li_2O + Na_2O + K_2O)$ | 5.81 | 5.85 | 5.81 | 5.85 | 5.84 | 6.06 | 6.25 | 6.25 | 6.88 |
| | $K_2O/ZrO_2$ | 0.13 | 0.13 | 0.13 | 0.13 | 0.10 | 0.06 | 0.10 | 0.10 | 0.00 |
| | $(K_2O + Al_2O_3)/ZrO_2$ | 0.62 | 0.71 | 0.62 | 0.71 | 0.77 | 0.59 | 0.63 | 0.63 | 2.48 |
| | $[(K_2O + Al_2O_3)/(ZnO + ZrO_2)]$ | 0.49 | 0.65 | 0.49 | 0.65 | 0.72 | 0.55 | 0.59 | 0.59 | 2.48 |

TABLE 2

| | | Example | | | | | | | | Com. Ex. |
|---|---|---|---|---|---|---|---|---|---|---|
| | | 1 | 2 | 3 | 4 | 5 | 6 | 7 | 8 | 1 |
| Crystallization condition | Nucleation temperature (° C.) | 540 | 540 | 540 | 540 | 540 | 540 | 540 | 540 | — |
| | Nucleation time(h) | 5 | 5 | 5 | 5 | 5 | 5 | 5 | 5 | — |
| | Nucleation growth temperature(° C.) | 740 | 740 | 730 | 710 | 720 | 730 | 740 | 760 | — |
| | Nucleation growth time (h) | 3 | 3 | 3 | 3 | 3 | 3 | 3 | 3 | — |
| | Crystalline phase | $Li_2Si_2O_5$ Cri. | $Li_2Si_2O_5$ Cri. | $Li_2Si_2O_5$ Cri. | $Li_2Si_2O_5$ Cri. Quartz | $Li_2Si_2O_5$ Cri. $Li_2SiO_3$ Petalite | $Li_2Si_2O_5$ Cri. Quartz Petalite | $Li_2Si_2O_5$ Cri. | $Li_2Si_2O_5$ Cri. | — |
| Glass property | Young's modulus E(GPa) | 89.1 | 95.3 | 94.5 | 91.5 | 94 | 95.6 | 92.5 | 90.9 | 82.4 |
| | Specific gravity ρ | 2.48 | 2.47 | 2.52 | 2.47 | 2.5 | 2.5 | 2.49 | 2.48 | 2.51 |
| | E/ρ | 35.9 | 38.5 | 37.5 | 37.1 | 37.5 | 38.2 | 37.1 | 36.6 | 32.9 |
| | Glass transition point Tg(° C.) | 762 | 777 | 774 | 714 | 717 | 758 | 766 | 774 | 706 |
| | Average linear expansion coefficient α ($\times10^{-7}$/° C.) | 112 | 100 | 122 | 112 | 89 | 97 | 97 | 107 | 66 |
| | Vickers hardness Hv | 742 | 749 | 693 | 699 | 689 | 725 | 715 | 717 | 602 |

Although several embodiments and/or examples of the present invention have been described in detail above, those skilled in the art will readily be able to make many modifications to these illustrative embodiments and/or examples without substantially departing from the novel teachings and advantageous effects of the present invention. Therefore, many of these modifications fall within the scope of the present invention.

The entirety of contents of all document cited in this specification and of the application on which priority under the Paris Convention of the present application is based are incorporated herein.

What is claimed is:

1. A glass containing a crystalline phase, comprising:

crystalline phases including cristobalite and lithium disilicate;

wherein the glass comprises, in mass % in terms of oxides, a $Li_2O$ component at a content of 8.1% or more and 13.0% or less;

wherein, in mass % in terms of oxides,

[(a content of a $P_2O_5$ component+a content of a $K_2O$ component+a content of a MgO component+a content of an $Al_2O_3$ component)/a content of a $ZrO_2$ component] is 4.0 or less;

wherein an average linear expansion coefficient at 100° C. to 300° C. is $85\times10^{-7}$/° C. or more, and a glass transition point is 680° C. or higher.

2. The glass containing a crystalline phase according to claim 1, comprising:

in mass % in terms of oxides, a $SiO_2$ component at a content of 65.0% to 85.0%; and the $Al_2O_3$ component at the content of 1.5% to 10.0%.

3. The glass containing a crystalline phase according to claim 1, comprising:

in mass % in terms of oxides, the $P_2O_5$ component at the content of more than 0% and 5.0% or less; and the $ZrO_2$ component at the content of 2.0% or more.

4. The glass containing a crystalline phase according to claim 1, comprising:

in mass % in terms of oxides, a $B_2O_3$ component at a content of 0% to 5.0%;

a $Na_2O$ component at a content of 0% to 5.0%;

the $K_2O$ component at the content of 0% to 5.0%;

the MgO component at the content of 0% to 5.0%;

a CaO component at a content of 0% to 5.0%;

a ZnO component at a content of 0% to 5.0%;

a $TiO_2$ component at a content of 0% to 5.0%;

a $Gd_2O_3$ component at a content of 0% to 5.0%;

a $Sb_2O_3$ component at a content of 0% to 3.0%; and a $Nb_2O_5$ component at a content of 0% to 3.0%.

5. The glass containing a crystalline phase according to claim 1, wherein, in mass % in terms of oxide, [(a content of a $SiO_2$ component+the content of the $Li_2O$ component)/the content of the $Al_2O_3$ component] is 6.4 or more.

6. The glass containing a crystalline phase according to claim 1, wherein a Vickers hardness is 700 or more.

7. A magnetic recording medium substrate, semiconductor support substrate, or optical substrate comprising the glass containing a crystalline phase according to claim 1.

8. A glass containing a crystalline phase, comprising:

crystalline phases including cristobalite and lithium disilicate;

wherein the glass comprises $SiO_2$ component, $Al_2O_3$ component, and $Li_2O$ component;

wherein the glass comprises, in mass % in terms of oxides, the $Li_2O$ component at a content of 8.1% or more and 13.0% or less;

and a $ZrO_2$ component at a content of 2.0% or more;

wherein, in mass % in terms of oxides,

[(a content of the $SiO_2$ component+the content of the $Li_2O$ component)/a content of the $Al_2O_3$ component] is more than 22.94;

wherein an average linear expansion coefficient at 100° C. to 300° C. is $85\times10^{-7}$/° C. or more, and a glass transition point is 680° C. or higher.

9. The glass containing a crystalline phase according to claim 8, comprising:

in mass % in terms of oxides, the $SiO_2$ component at the content of 65.0% to 85.0%; and the $Al_2O_3$ component at the content of 1.5% to 10.0%.

10. The glass containing a crystalline phase according to claim 8, comprising:

in mass % in terms of oxides, a $P_2O_5$ component at a content of more than 0% and 5.0% or less.

11. The glass containing a crystalline phase according to claim 8, comprising:

in mass % in terms of oxides, a $B_2O_3$ component at a content of 0% to 5.0%;

a $Na_2O$ component at a content of 0% to 5.0%;

a $K_2O$ component at a content of 0% to 5.0%;

a MgO component at a content of 0% to 5.0%;

a CaO component at a content of 0% to 5.0%;

a ZnO component at a content of 0% to 5.0%;

a $TiO_2$ component at a content of 0% to 5.0%;

a $Gd_2O_3$ component at a content of 0% to 5.0%;

a $Sb_2O_3$ component at a content of 0% to 3.0%; and a $Nb_2O_5$ component at a content of 0% to 3.0%.

12. The glass containing a crystalline phase according to claim 8, wherein a Vickers hardness is 700 or more.

13. A magnetic recording medium substrate, semiconductor support substrate, or optical substrate comprising the glass containing a crystalline phase according to claim 8.

* * * * *